(12) United States Patent
Solihin

(10) Patent No.: US 8,667,227 B2
(45) Date of Patent: Mar. 4, 2014

(54) DOMAIN BASED CACHE COHERENCE PROTOCOL

(75) Inventor: Yan Solihin, Apex, NC (US)

(73) Assignee: Empire Technology Development, LLC, Wilmington, DE (US)

( * ) Notice: Subject to any disclaimer, the term of this patent is extended or adjusted under 35 U.S.C. 154(b) by 612 days.

(21) Appl. No.: 12/644,658

(22) Filed: Dec. 22, 2009

(65) Prior Publication Data
US 2011/0153946 A1 Jun. 23, 2011

(51) Int. Cl.
*G06F 13/00* (2006.01)
(52) U.S. Cl.
USPC .................................. 711/146; 711/E12.023
(58) Field of Classification Search
None
See application file for complete search history.

(56) References Cited

U.S. PATENT DOCUMENTS

| | | | |
|---|---|---|---|
| 7,111,124 B2 | 9/2006 | Iyer et al. | |
| 7,370,243 B1 | 5/2008 | Grohoski et al. | |
| 7,571,284 B1 | 8/2009 | Olson et al. | |
| 8,244,986 B2 * | 8/2012 | Solihin | 711/148 |
| 2006/0143384 A1 | 6/2006 | Hughes et al. | |
| 2006/0179252 A1 * | 8/2006 | Cantin et al. | 711/144 |
| 2006/0224833 A1 * | 10/2006 | Guthrie et al. | 711/141 |
| 2006/0248287 A1 | 11/2006 | Buyuktosunoglu et al. | |
| 2007/0204130 A1 | 8/2007 | Hass et al. | |
| 2008/0059712 A1 | 3/2008 | Fedorova | |
| 2008/0077740 A1 | 3/2008 | Clark et al. | |
| 2008/0301385 A1 | 12/2008 | Nagata et al. | |
| 2009/0013331 A1 * | 1/2009 | May | 719/315 |
| 2009/0031086 A1 * | 1/2009 | Carpenter et al. | 711/146 |
| 2009/0089790 A1 * | 4/2009 | Manczak et al. | 718/104 |
| 2012/0166735 A1 * | 6/2012 | Solihin | 711/146 |

OTHER PUBLICATIONS

PCT International Search Report PCT/ISA/220.
PCT Written Opinion of the International Searching Authority PCT/ISA/237.
"Flexible Cache Partitioning for Large-Scale Titled Chip Multiprocessors"; (2009) p. 1-12.
"Cooperative Caching for Chip Multiprocessors", (2006) Jichuan Chang et al.; Computer Sciences Dept., University of Wisconsin-Madison.
"Virtual Hierarchies to Support Server Consolidation", (2007) Michael R. Marty et al.; ISCA, p. 1-11.
International Preliminary Report on Patentability for application with application No. PCT/US2010/50171, dated Jul. 5, 2012, 9 pages.
International Search Report and Written Opinion for application with application No. PCT/US10/50171, dated Mar. 14, 2011, 20 pages.

* cited by examiner

*Primary Examiner* — Sean D Rossiter
(74) *Attorney, Agent, or Firm* — Moritt Hock & Hamroff LLP; Steven S. Rubin, Esq.

(57) ABSTRACT

Briefly stated, technologies are generally described for accessing a data block in a cache with a domain based cache coherence protocol. A first processor in a first tile and first domain can be configured to evaluate a request to access the data block. A cache in a second tile in the first domain can be configured to send the data block to the first tile when the data block is cached in the second tile. The first processor can be configured to send the request to a third tile in another domain when the cached location is outside the first processor's domain. The third processor can be configured to determine and send the request to a data domain associated with the cached location of the data block. A fourth tile can be configured to receive the request and send the data block to the first tile.

26 Claims, 11 Drawing Sheets

| Event | Message | Cache 150 in tile 130 | Cache 154 in tile 134 | Cache 157 in tile 137 | Directory for X stored in cache 164 of tile 144 Shared vector {domain 120, domain 122, domain 124}, state |
|---|---|---|---|---|---|
| 200 | | | | | |
| 202 - | - | | X, shared | - | {1,0,0}, shared |
| 204 Processor in tile 130 requests X from tile 134 | Retrieve request from tile 130 to tile 134; Send data from tile 134 to tile 130 | X, shared | X, shared | - | {1,0,0}, shared |
| 206 Write to X | Write by tile 130, invalidating tile 134; Request status change from tile 130 to tile 144 | X, modified | X, invalid | - | {1,0,0}, modified |
| 208 Read X from tile 137 | Retrieve request from tile 137 to tile 144; Send request to tile 134; Send data from tile 134 to tile 137 | X, shared | X, invalid | X, shared | {1,0,1}, shared |

Fig. 7

DOMAIN BASED CACHE COHERENCE PROTOCOL

BACKGROUND

Unless otherwise indicated herein, the materials described in this section are not prior art to the claims in this application and are not admitted to be prior art by inclusion in this section.

In multi-core processor architectures, multiple processor cores may be included in a single integrated circuit die or on multiple integrated circuit dies that are arranged in a single package. A cache may be used to locally store data for access by one or more of the processor cores. The data can be a subset of data stored in a larger memory that is typically located outside of the die.

A single piece of data may be stored in multiple caches, and a cache coherence protocol may be used to keep track of data stored in the multiple caches. The cache coherence protocol is configured to ensure that multiple requests for the data consistently result in the same data being returned. The cache coherence protocol may be directory based, where data stored in cache is indexed in a directory. The directory may be used as a filter and process requests to retrieve data stored in multiple caches. When an entry in the directory is changed, indicating a change in corresponding data stored in a cache, the directory updates or invalidates the status of other caches indexed with that entry. In this way, caches with an old version of the data are no longer indexed as valid sources of the data in the directory.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a state diagram for a domain based cache coherence protocol;

Figure 1:
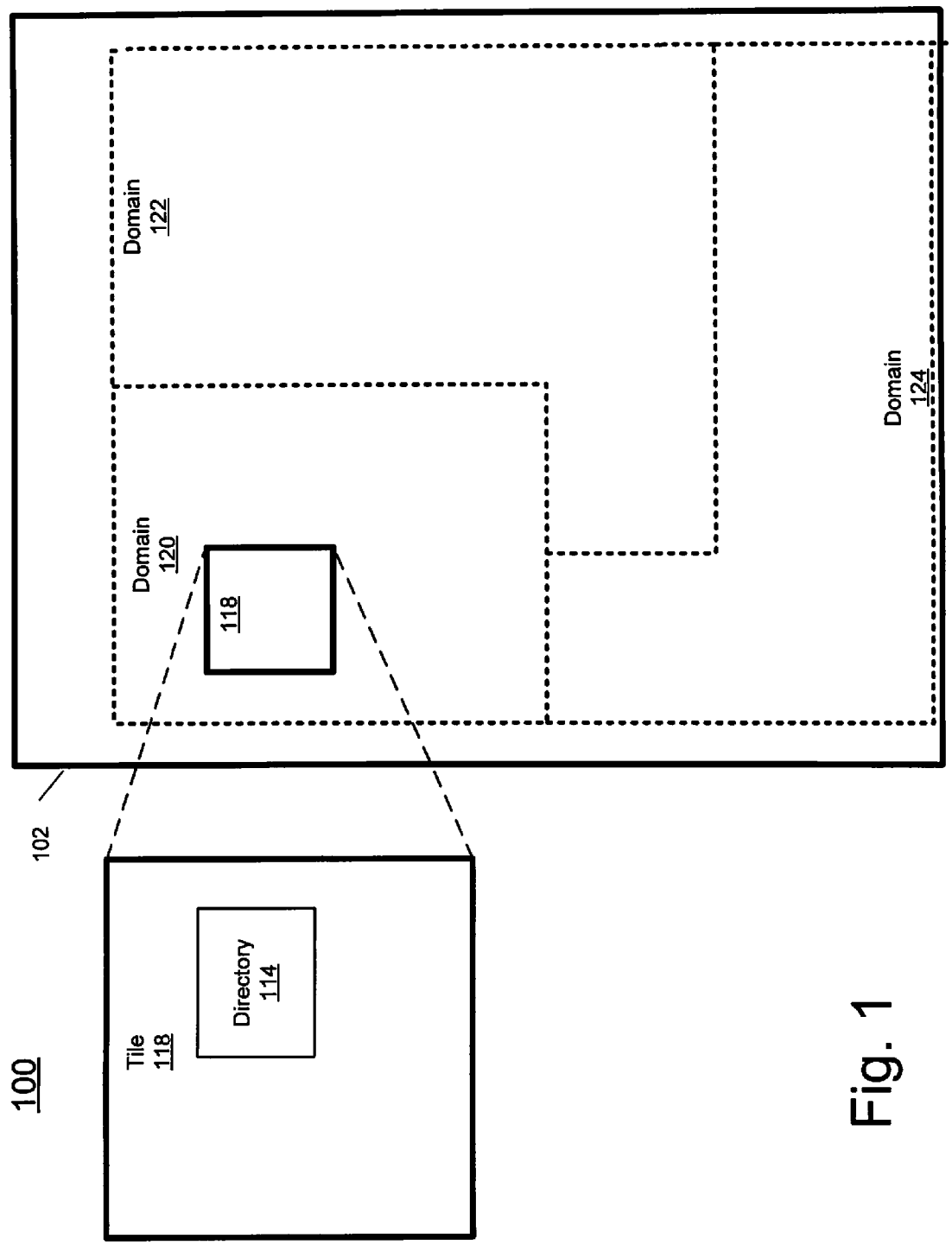
FIG. 1 illustrates an example system that can be utilized to implement a domain based cache coherence protocol.

all arranged according to at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to providing a domain based cache coherence protocol.

Briefly stated, technologies are generally described for accessing a data block in a cache with a domain based cache coherence protocol. A first processor in a first tile and first domain can be configured to evaluate a request to access the data block. A cache in a second tile in the first domain can be configured to send the data block to the first tile when the data block is cached in the second tile. The first processor can be configured to send the request to a third tile in another domain when the cached location is outside the first processor's domain. The third processor can be configured to determine and send the request to a data domain associated with the cached location of the data block. A fourth tile can be configured to receive the request and send the data block to the first tile.

In the following discussion, a data block can be stored in a cache (e.g., the data block is cached). The location of the storage in the cache can be referred to as a storage location, a cache location, a cached location, a cached storage location, or any other reasonable equivalent without departing from the spirit of the present disclosure. Moreover, a data block may refer to any appropriate data that can be stored in a cache, including but not limited to a single data (e.g., a data value that may be stored in a cache for use by a processor), a block of data, a single executable code (e.g., code that may be stored in a cache for execution by a processor), a block of executable code, or some combination thereof.

FIG. 1 illustrates an example system that can be utilized to implement a domain based cache coherence protocol in accordance with at least some embodiments presented herein. System 100 may include a die 102 that is divided into a plurality of domains 120, 122, 124. Each domain 120, 122, 124 may include one or more tiles 118. One or more of the tiles 118 can include a directory 114, although for simplicity only one directory 114 in one tile 118 is shown. Die 102 may be divided into domains 120, 122, 124, where each domain may correspond to a logical partition of the die, a physical partition of the die, a geographically determined partition of the die, or by any other method. In some examples, each domain 120, 122, 124 may be used to host an isolated environment such as an application or a virtual machine. Domains 120, 122, 124 may be dynamically reallocated depending upon the application. Directory 114 may comprise a table identifying each data block stored in cache in die 102 and a representation of the domain 120, 122, 124 where the data block is stored (e.g. the cache location, storage location, cached storage location, etc.). As is described in more detail below, when a processor in a requesting domain is required to retrieve data block X stored in a cache in die 102, the processor may first search in the requesting domain for data block X. For example, the processor may search or evaluate a directory in the requesting domain to determine if data block X is cached in one or more tiles of the requesting domain. This operation is described in more detail below. If the data block X is not stored in the requesting domain, the requesting processor may send the request to the directory 114 which may be stored in a tile outside the requesting domain. A processor in the same tile as the directory may then forward the request to the domain storing data block X.

Figure 2:
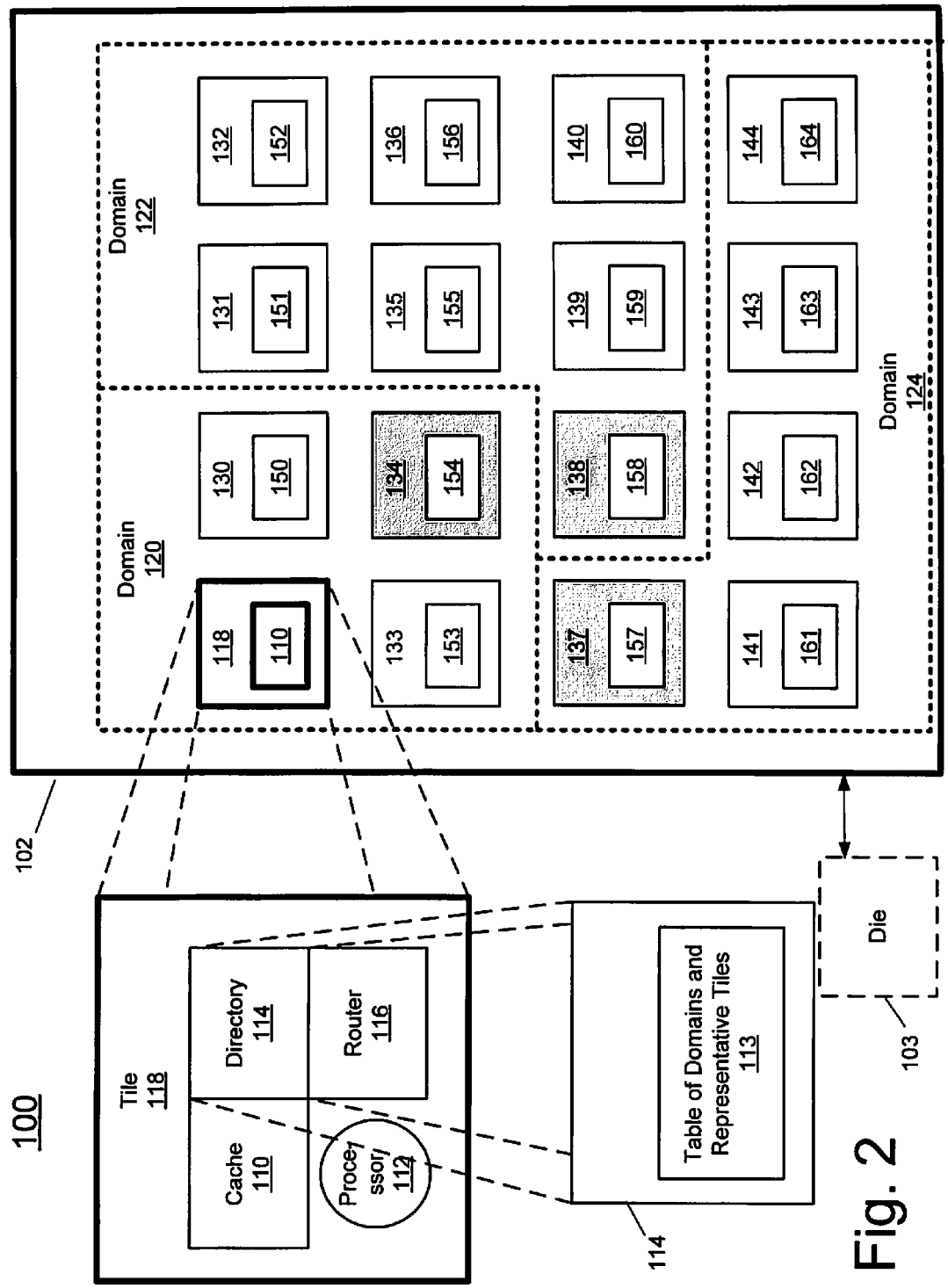
FIG. 2 illustrates an example system that can be utilized to implement a domain based cache coherence protocol.

FIG. 2 is an illustration of a system that can be utilized to implement a domain based cache coherence protocol in accordance with at least some embodiment described herein. The system of FIG. 2 is substantially similar to system 100 of FIG. 1, with additional details. Those components in FIG. 2 that are labeled identically to components of FIG. 1 will not be described again for the purposes of clarity.

As illustrated in FIG. 2, each domain 120, 122, 124 may include a plurality of tiles to support the operation of the respective domain. For example, domain 120 can include tiles 118, 130, 133, and 134 with respective caches 110, 150, 153, and 154. Domain 122 can include tiles 131, 132, 135, 136, 138, 139 and 140 with respective caches 151, 152, 155, 156, 158, 159 and 160. Domain 124 can include tiles 137, 141, 142, 143, 144 with respective caches 157, 161, 162, 163 and 164. The number and location of each tile in a respective domain is arbitrary and may be altered as desired. Not every tile necessarily includes a cache. Tiles may be substantially the same as in a homogeneous arrangement or different as in a heterogeneous arrangement. Domains may also extend to another die 103. Discussions below focus on die 102 only for simplicity but it should be understood that die 103 may be used in conjunction with die 102.

Focusing on tile 118 as an example of one tile, which may be a representative example of the various tiles. Tile 118 may include a cache 110, a processor or processor core (hereinafter referred to as "processor" for simplicity) 112, a directory 114, and a router 116. Directory 114 may include a table 113. Processor 112 may be configured to process data including code. Cache 110 may be configured to store data local to processor 112, where the locally stored data may be a subset of data (or code) available in a larger memory perhaps outside of die 102. Router 116 may be configured to route data between tile 118 and other tiles in domain 120, to other domains 122, 124 or outside of die 102.

Table 113 may be a table that identifies domains and their representative tiles. A complete directory may be comprised of one or more directories 114 that may be distributed among multiple domains 120, 122, 124 or in one domain 120, 122, 124. Table 113 may indicate the presence or absence of a particular piece of data and/or code (sometimes referred to as a data block) in each domain. For example, table 113 may indicate that a particular piece of data block X is stored in a particular cache in domains 120 and 122.

Table 113 may be adapted to store indications of the location of data and/or code in many different ways. For example, table 113 may include a shared bit-vector representing each domain. A value of "1" may indicate that data block X is stored in cache and a value of "0" may indicate that data block X is not stored in cache. In one example including three total domains a shared bit-vector may be represented as X: {1, 1, 0}, indicating that data block X is stored in caches in a first domain and a second domain, and not stored in (absent from) the cache of a third domain.

Table 113 may also be adapted to identify a set of representative tiles for each domain. For example, a representative tile may be designated for each domain 120, 122, 124. The representative tile may represent the entire domain of tiles when the domain is communicating with tiles from other domains. For example, in FIG. 2, tile 134 is shaded in gray illustrating that tile 134 can be the representative tile for domain 120. Similarly, tile 138 can be the representative tile for domain 122 and tile 137 is the representative tile for domain 124. Representative tiles 134, 137 and 138 may be configured to serve as gatekeepers for respective domains and are queried when directory 114 is performing inter-domain coherence. For example, when tile 142 in domain 124 wishes to access (e.g., read from or write to) data block Y from a cache in domain 120, tile 142 may be configured to send a request to the tile with the directory for data block Y (see FIG. 3 and related discussion). The directory tile may be configured to send the request to representative tile 134 of domain 120.

Figure 3:
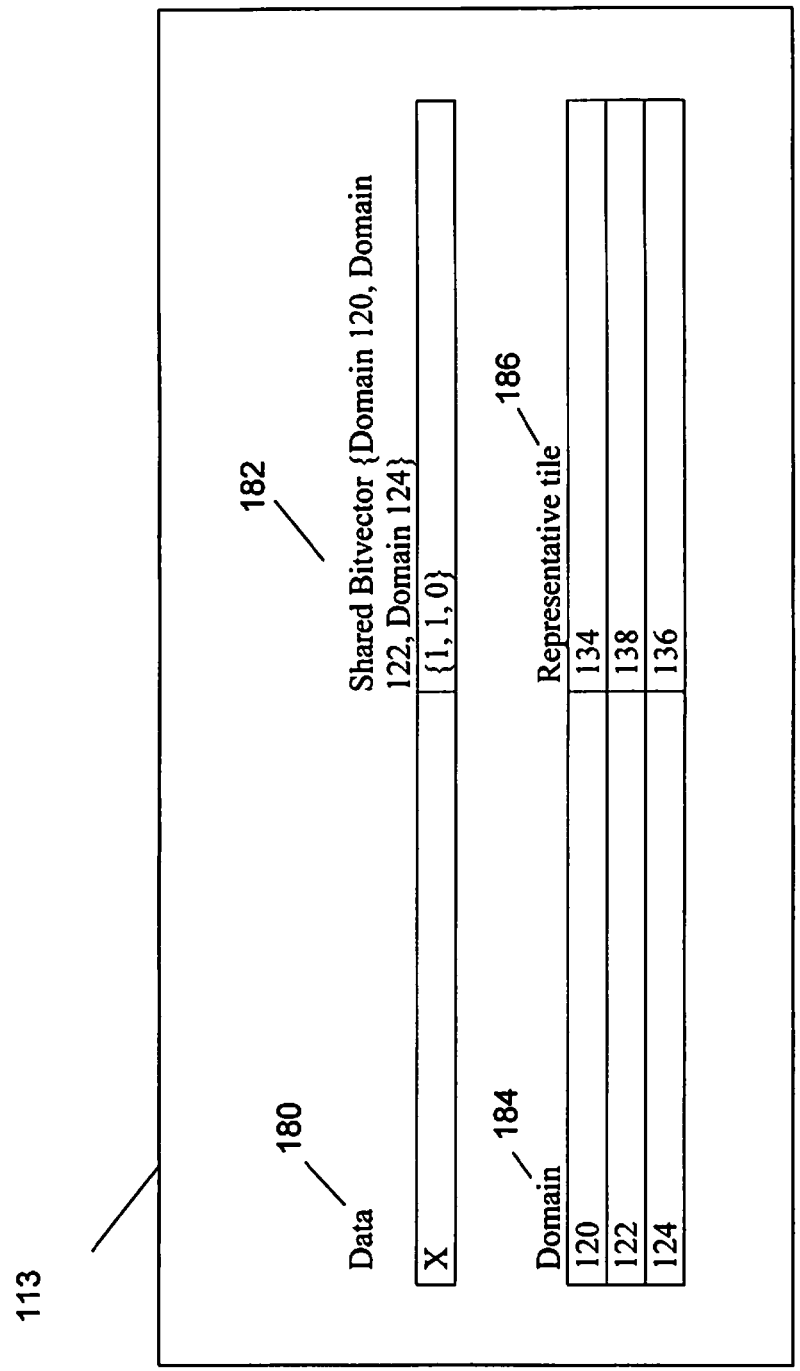
FIG. 3 depicts an example table that can be used by the system in FIG. 2.

FIG. 3 depicts an example table that can be used by the system in FIG. 2, arranged in accordance with at least some embodiments described herein. FIG. 3 includes a representation of data block 180, a shared bit-vector 182, and a list of representative tiles 186 for each domain 184.

Figure 4:
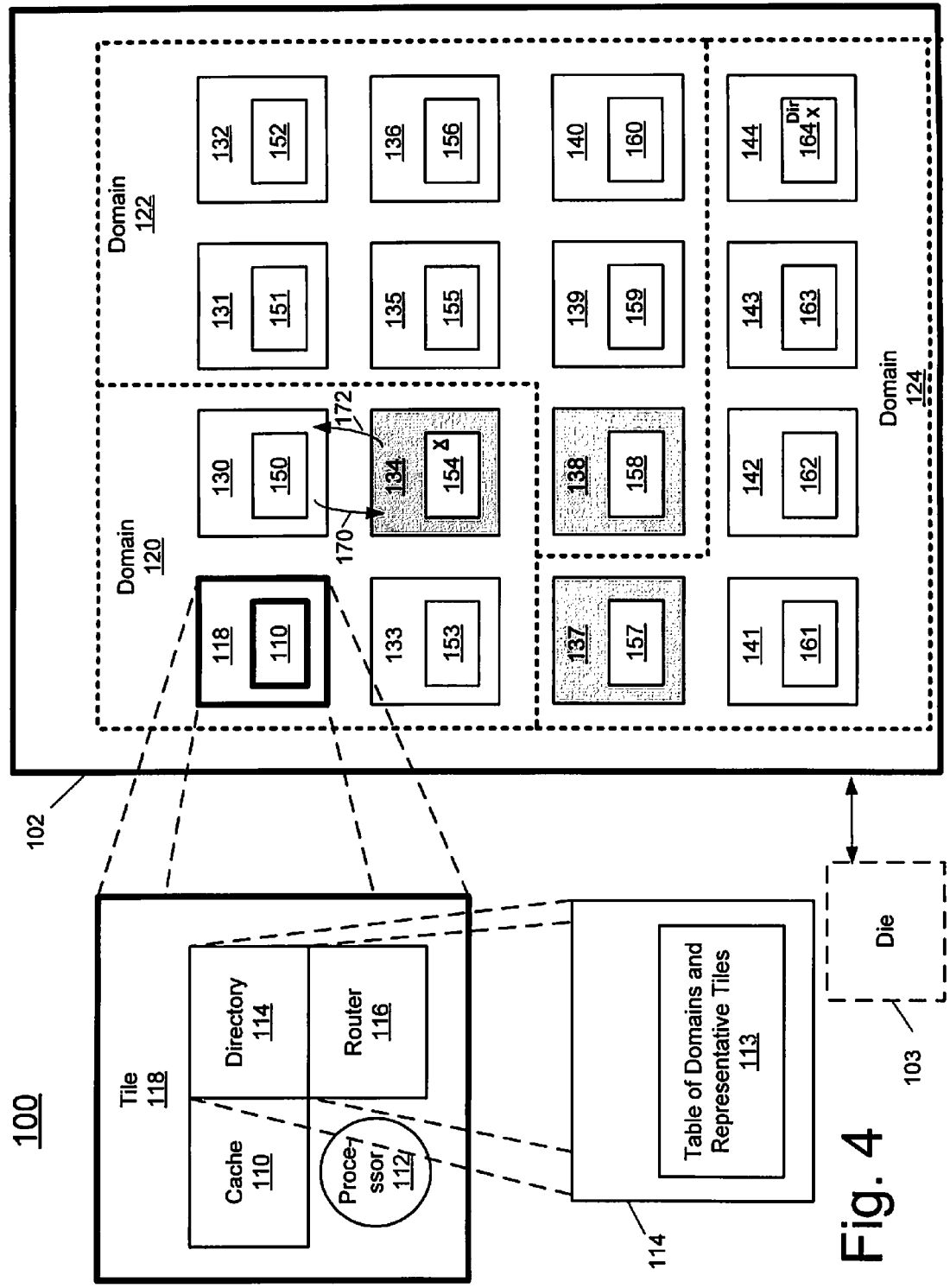
FIG. 4 depicts an example system that can be used to implement a domain based cache coherence protocol.

Table 113 may be utilized to keep track of data and/or code stored in various caches of tiles (e.g. caches 110, 150-164). Similar to directory 114, table 113 may be stored in one tile or distributed among many tiles. Additionally, each tile can keep track of data stored in all caches within the respective domain of the tile. Table 113 may be part of directory 114 or distinct from directory 114. Reference may now be made to FIG. 4.

FIG. 4 depicts an example system that can be used to implement a domain based cache coherence protocol in accordance with at least some embodiments described herein. Those components in FIG. 4 that are labeled identically to components of FIGS. 1 and 2 will not be described again for the purposes of clarity.

In the examples presented in FIG. 4, a processor 112 in tile 130 may be configured to send a request 170 directly to tile 134 when processor 112 needs to access (e.g., read or write) data block X that is stored in cache 154 of tile 134 in the same domain 120. Processor 112 in tile 118 can be configured to determine that data is stored in tile 134 in different ways. In one example, system 100 uses static mapping of location/address to tile, using the address that is in the operand of the load/store instruction that causes the read/write access. In this example, for any address, one tile may store a copy of data. In another example, data may be replicated across tiles, and processor 112 in tile 118 may be configured broadcast a request to other tiles in the same domain. In another example, a mini-directory may be used for the domain. Processor 112 in tile 118 may be configured to search the mini-directory to determine which caches store data for a particular address. In another example, processor 112 in tile 118 may be configured to predict which tile stores the data—for example by searching previously known locations for the data block. If the prediction is incorrect, processor 112 may be configured to then broadcast the request inside the domain.

Figure 5:
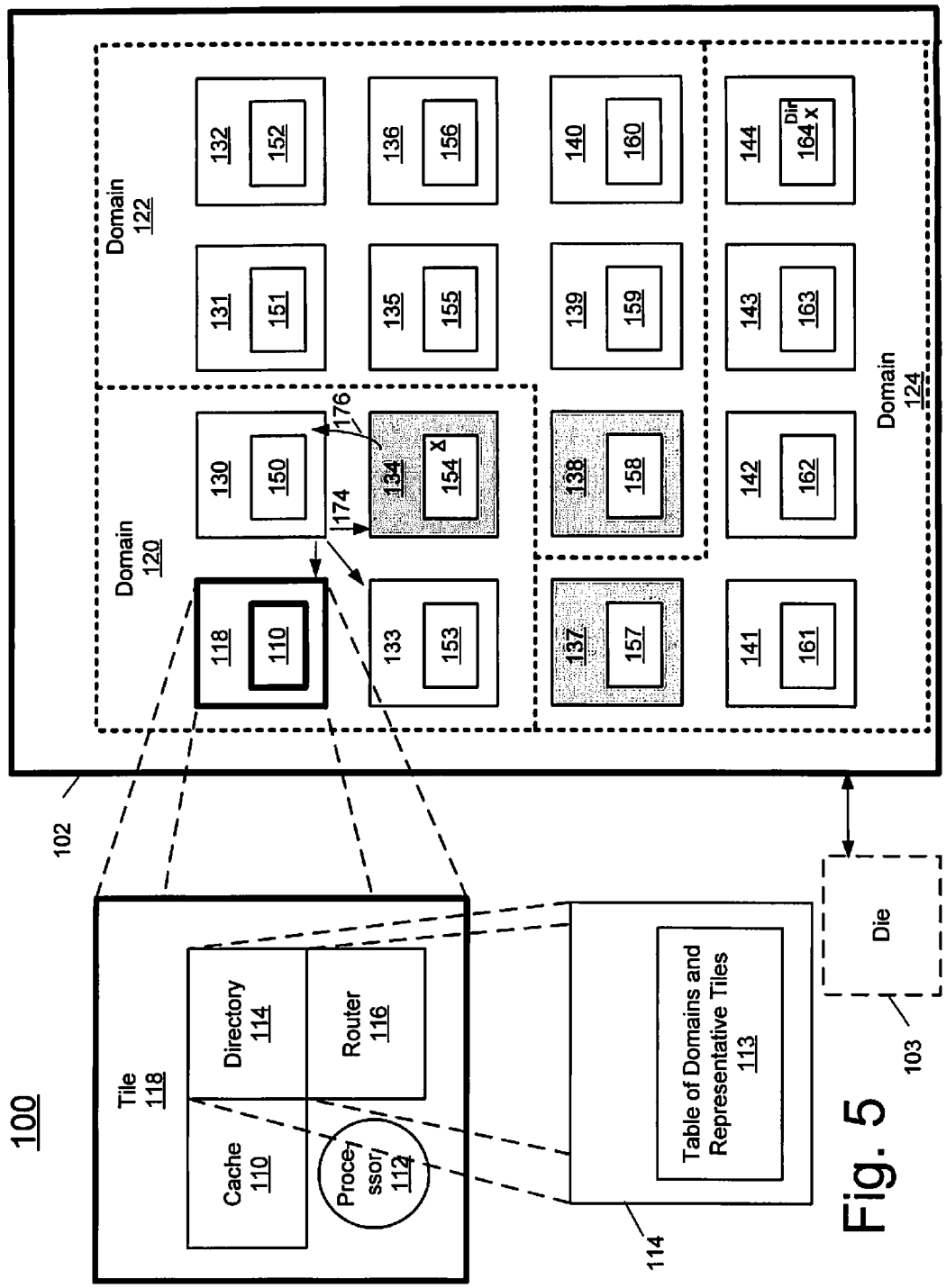
FIG. 5 depicts a system that can be used to implement a domain based cache coherence protocol.

FIG. 5 depicts another example system that can be used to implement a domain based cache coherence protocol in accordance with at least some embodiments described herein. Those components in FIG. 5 that are labeled identically to components of FIGS. 1, 2 and 4 will not be described again for the purposes of clarity.

As shown in FIG. 5, processor 112 in tile 130 may be configured to send out a broadcast request 174 to all tiles 118, 133, 134 in domain 120, and may also be configured to receive response 176 from tile 134 including data block X (e.g., one or more pieces of data and/or code).

In the embodiments shown in FIGS. 4 and 5, when data block X is stored within domain 120, data block X can be sent to requesting tile 130 without consultation with the respective directory 114 for data block X, which may reside in any tile in any domain. When data block X is not stored within domain 120, or is stored only partially in domain 120, a request may be made to a directory storing cache information about data block X. In some examples, a processor core 112 in tile 130 of domain 120 may be required to access data block X, where data block X may be stored in cache 154 of tile 134 in the same domain 120. For these examples, processor core 112 in tile 130 may be configured to send request 170 directly to tile 134. Responsive to request 170, tile 134 is configured to send data block X to tile 130. The transmission (or sending) of data block X to tile 130 may include a number of operations such as, for example, copying at least a part of the data block X, moving at least a part of the data block X, or some combination of copying or moving over time, etc.

Figure 6:
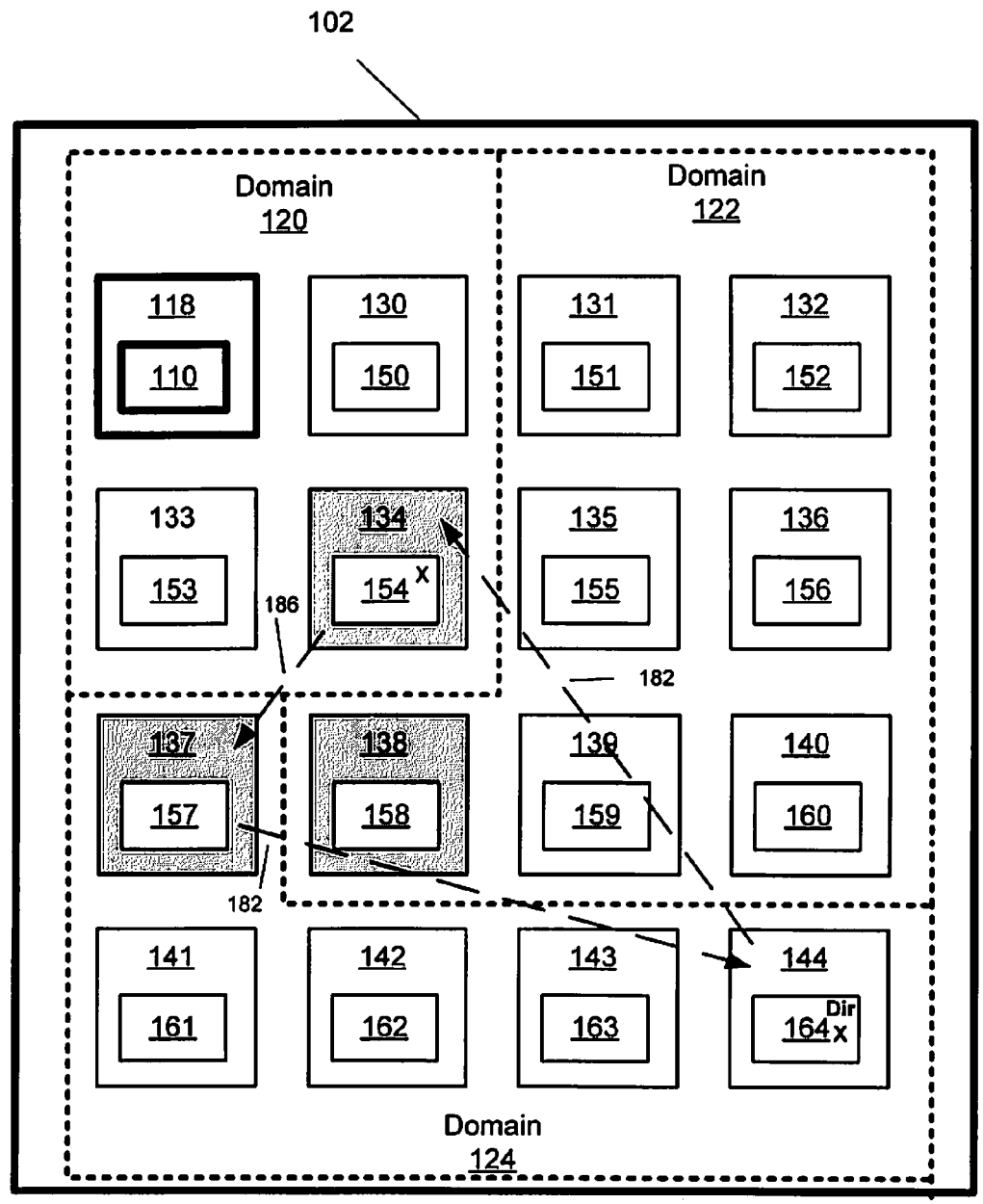
FIG. 6 illustrates an example system that can be used to implement a domain based cache coherence protocol.

FIG. 6 illustrates an example system that can be used to implement a domain based cache coherence protocol in accordance with at least some embodiments described herein. Those components in FIG. 6 that are labeled identically to components of FIGS. 1, 2, 4 and 5 will not be described again for the purposes of clarity.

In FIG. 6, tile 137 can be configured to send a request 182 to a directory 114 when tile 137 is required to access (e.g., read or write) data block X not stored in its domain 124. Directory 114 may be located in another tile. For example, the directory 114 for data block X may be stored in tile 144, where tile 144 can be configured to search (or evaluate) directory 114 and table 113 (see FIG. 3) to identify the applicable domain (domain 120) and the representative tile (e.g., 134) where data block X is presently available. Tile 144 can thus be adapted to send a request 182 to tile 134, while tile 134 can be arranged to determine which tile in domain 120 has data block X stored therein. Alternatively, if data block X is not present in any tiles, tile 44 can be adapted to request data from another memory such as a lower level cache or a main memory. In some examples, tile 134 itself can have data X stored therein, and thus tile 134 can be configured to send 186 data block X to tile 137. The directory in tile 144 may be configured to thereafter be updated to indicate that data is cached in domains 120 and 122.

In some examples, request 182 may be a broadcast request that is sent to many tiles 118 within domain 120. In some other examples, request 182 may be a directed request that is sent to a particular tile that includes directory 114.

FIG. 7 illustrates a state diagram for a domain based cache coherence protocol that is arranged in accordance with at least some embodiments of the present disclosure. FIG. 7 shows a heading 200, an initial state 202, and three state changes 204, 206 and 208. Heading 200 includes fields for "Event", "Message", "Cache 150 in Tile 130", "Cache 154 in Tile 134", "Cache 157 in Tile 137", and "Directory for X stored in cache 164 of tile 144; Shared Vector {domain 120, domain 122, domain 124}, state".

As shown in FIG. 7, at initial state 202, data block X is stored in cache 154 of tile 134, and cache 154 indicates that data block X is stored with a status of "shared." A directory for data block X, which may be stored in tile 144, may indicate that data block X is stored only in domain 120. In some examples, a bit-vector can be used to indicate whether a particular domain includes a cache with the data block X. Looking at domains 120, 122, 124 in order, the bit-vector {1, 0, 0} indicates the status of data block X as stored in a cache of domain 120, but not stored in (e.g., absent from) domains 122 and 124.

State 204 represents the situation described above with reference to FIGS. 4 and 5, where tile 130 sends a request to tile 134 for data block X to access data block X from tile 134. Cache 150 is updated to indicate that data block X is now stored in cache 150 in a shared state. Status of data block X in cache 154 of tile 134 similarly indicates that data block X is stored in cache 154 in a "shared" state. The directory for data block X need not be involved in this sending of data, and the directory for data block X in cache 164 remains the same since only domain 120 presently includes data block X.

State 206 represents the situation where tile 130 is required to write to data block X, and tile 130 sends a request to the directory for data block X to change the cache state to "modified." As a consequence of the described write operation, the status of data block X in cache 150 of tile 130 is changed to "modified." Cache 154 in tile 134 is changed to "invalid" and the directory for data block X in cache 164 is changed to modified.

State 208 represents the situation where tile 137 in domain 124 needs to access data block X. In this state, tile 137 is configured to send a request to the directory of data block X stored in tile 144. In response to the request, tile 144 is arranged to search (or evaluate) directory 114 and Table 113 (see FIG. 3) and identify the applicable domain (domain 120) and the representative tile in that domain for data block X. Tile 144 is also configured to send request 182 to tile 134, where tile 134 is arranged to determine which tile in domain 120 is storing data block X. Since tile 130 includes data block X stored therein, tile 134 is arranged to send request 186 data block X to tile 137. The directory 114 in cache 164 is then updated to indicate that data block X is now stored in domain 124. The status of data block X in cache 150 is changed to "shared", the status of data block X in cache 154 is changed to "invalid", and the status of cache 157 is changed to "shared". The directory bit-vector for data block X can thus be changed to {1, 0, 1}. In addition to the shared, invalid, and modified states, other specialized states may also be used to reflect situations where data is shared within a domain or across domains. For example, specialized states such as shared-within-domain, and shared-across-domain, etc. In this way, when a write operation is performed, invalidation can occur within a domain, and not necessarily involve the directory.

As directory 114 is arranged to maintain a cache directory at a domain level, directory 114 need not keep track of where a block of data resides in a domain. In other words, the block of data can be moved from one cache to another within a domain, or the block of data may be replicated at multiple cache tiles within a domain without involving communication with directory 114. Each domain has flexibility in managing a cache policy of all cache slices within the domain without communicating with the directory. For example, caches in multiple tiles in a domain may be aggregated together to form a large shared cache. Each processor 112 can be adapted to access data in the shared cache. Each domain may be arranged to organize cache policies so as to minimize a number of times the domain communicates with the directory, which may result in enhanced locality, or may minimize on-chip network traffic. The directory can be involved when a block is shared by multiple domains or when a state of a block does not allow a particular cache action (e.g. for write operations).

Among other possible benefits, performance isolation among domains may be improved because cache activities that can be satisfied within a domain no longer necessitate communication with the directory. A cache miss can be satisfied more quickly because a cache closer to the requesting processor than the directory may indicate that the pertinent block of data is either stored or not stored in the cache. Moreover, requested blocks of data may more frequently be found within a domain resulting in savings in cache miss delay and resulting in less network traffic.

System 100 may provide benefits over tile based directory coherence approaches. For example, as fewer domains may be implemented than tiles, directory space overhead may be made smaller. Domains may compete with each other less in attempting to access the directory especially when data is requested and stored in the same domain.

Figure 8:
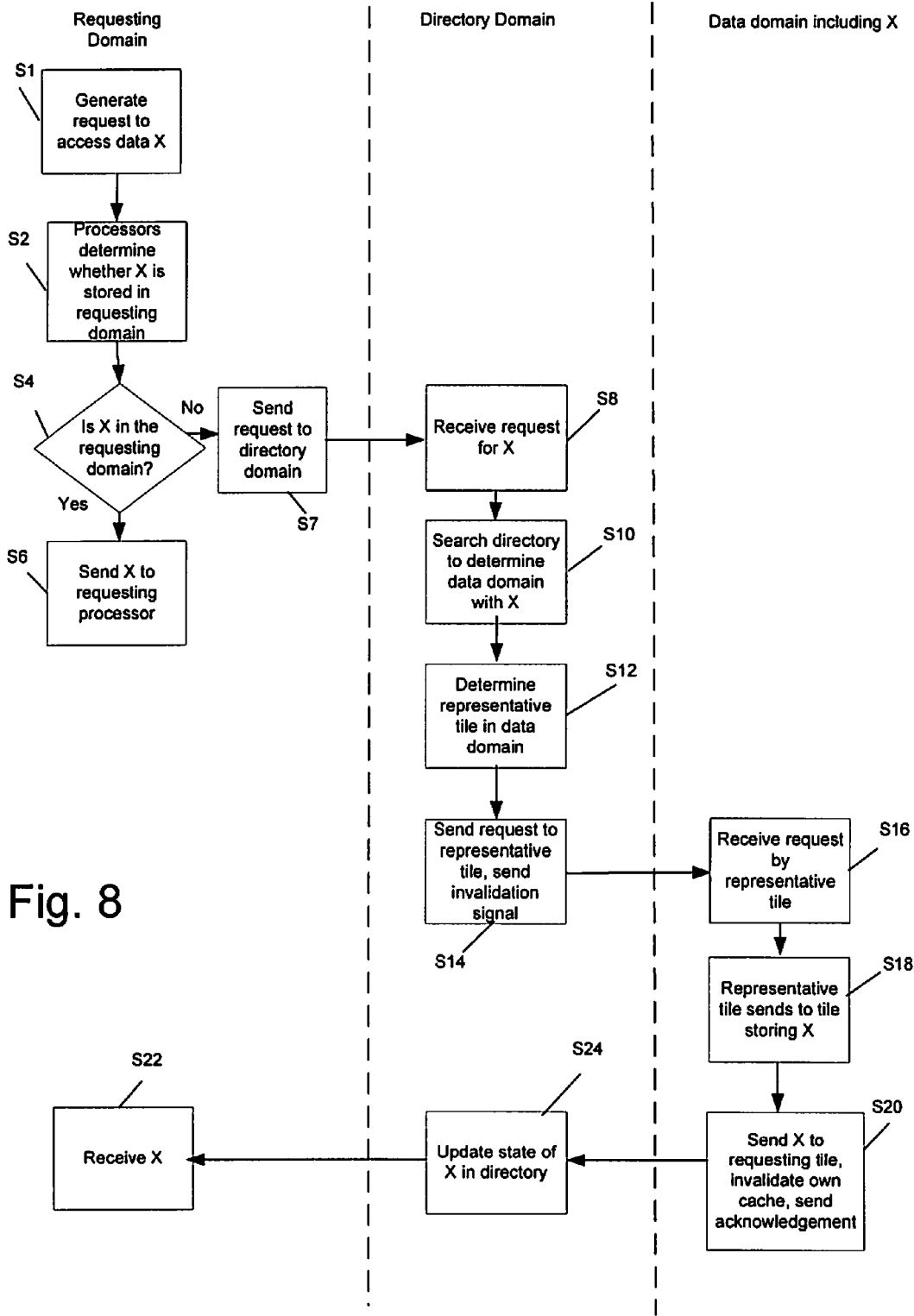
FIG. 8 depicts a flow diagram for an example process for a domain based cache coherence protocol.

FIG. 8 depicts a flow diagram for an example process for a domain based cache coherence protocol in accordance with at least some embodiments of the present disclosure. The process in FIG. 8 could be implemented using, for example, system 100 discussed above. An example process may include one or more operations, actions, or functions as illustrated by one or more of blocks S1, S2, S4, S6, S7, S8, S10, S12, S14, S16, S18, S20, S22, and/or S24. Although illustrated as discrete blocks, various blocks may be divided into additional blocks, combined into fewer blocks, or eliminated, depending on the desired implementation. Processing may begin at block S1.

At block S1, a processor in a first requesting domain can be adapted to generate a request to access data block X. Block S1 can be followed by block S2, where processors in the requesting domain can be arranged to determine whether X is stored in the requesting domain. Processing may continue from block S2 to block S4, where a query can be made whether data block X is located (e.g., stored) in the requesting domain. When data block X is determined to be located (e.g., cached) in the requesting domain ("Yes"), processing may continue from block S4 to block S6, where data block X can be sent to the requesting processor. Otherwise, when data block X is determined to be absent or not found in the requesting domain ("No"), processing may continue from block S4 to block S7.

At block S7 the request can be sent to a directory domain including a directory for X. Processing may continue from block S7 to block S8, where a processor in the directory domain can be arranged to receive the request. Continuing from block S8 to block S10, the processor in the directory domain can be arranged to search (e.g., evaluate) the directory to determine a data domain where data block X is stored. If the data is not cached in any domain, the data may be retrieved from a lower level cache or main memory by the tile that stores the directory. Proceeding from block S10 to block S12, the processor in the directory domain can be arranged to further search the directory to determine a representative tile in the data domain. Block S12 can be followed by block S14, where the request can be sent to the representative tile in the data domain. The data domain could be, for example, the same as the directory domain or a different domain. The request may also include an invalidation signal when the request is a request to write to the data.

Block S14 can be followed by block S16, where the request can be received by a processor in a representative tile in the data domain. Continuing from block S16 to block S18, the representative tile can be arranged to send the request to the tile storing data block X. Proceeding from block S18 to block S20, the processor in the tile storing data block X can be arranged to send data block X to the requesting processor in the requesting domain. Block S20 may also include the processor storing the data block being adapted to invalidate its cache and send an acknowledgement of the invalidation to the requesting processor when the request is a request to write to the data. Continuing from block S20 to block S22, the requesting processor in the requesting domain is arranged to receive data block X. Block S20 can be followed by block S24, where the processor in the directory domain is arranged to update a state of data block X, such as to indicate that data block X is now also stored in the requesting domain. Block S24 could also follow, for example, block S10.

If data block X is only cached at the requesting processor in a state that permits a write (e.g., a "modified" state), data block X can be written directly by the requesting processor without involving blocks S1 through S20. If data block X is not cached at the requesting processor, or cached in more than one location, block S14 may involve sending an invalidation signal to all tiles that include a copy of X. Block S20 may include a processor adapted to invalidate a local copy of block X, and sending an acknowledgement signal to the requesting processor.

Figure 9:
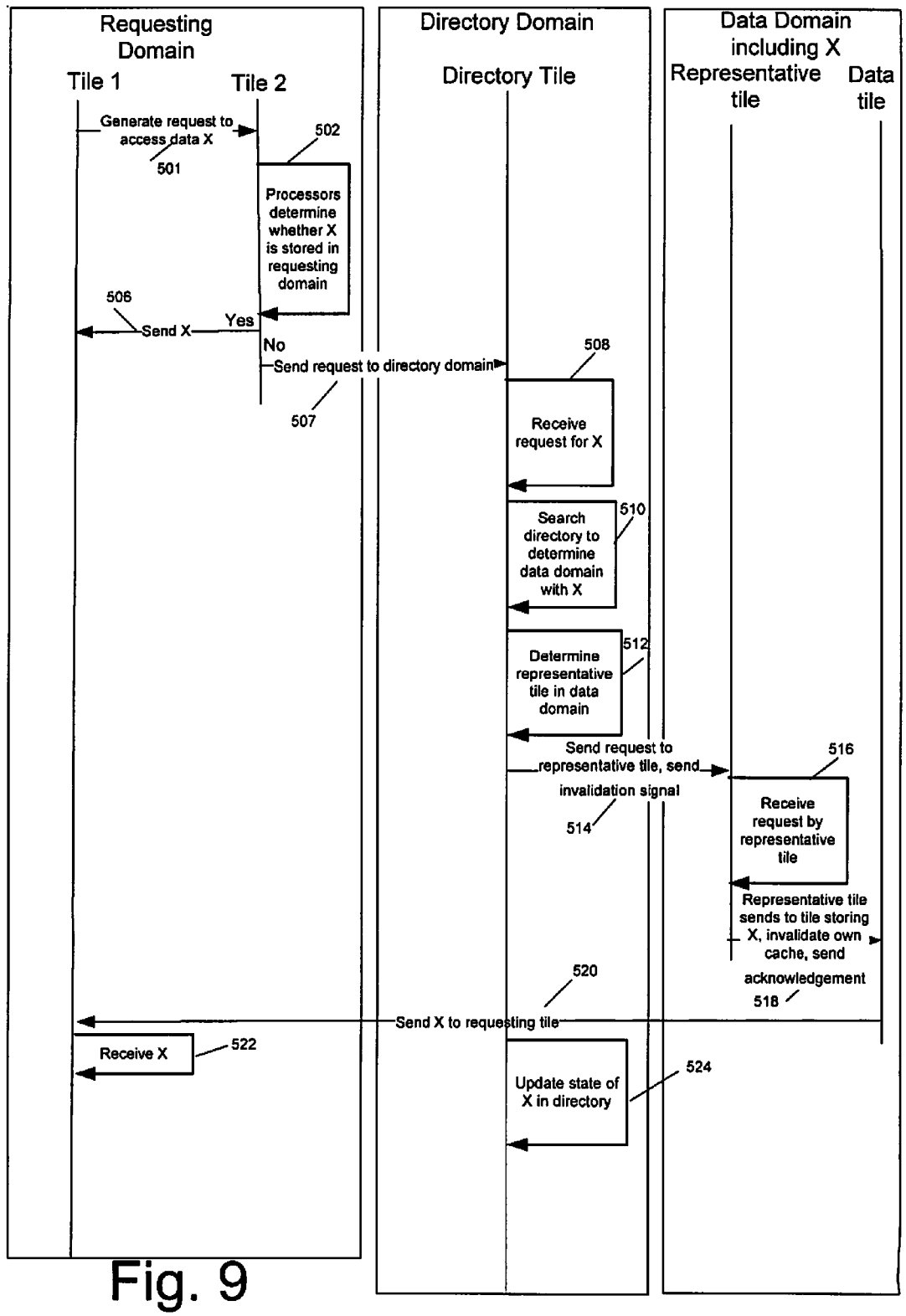
FIG. 9 depicts a signal flow diagram for an example process for a domain based cache coherence protocol.

FIG. 9 depicts a signal flow diagram for an example process for a domain based cache coherence protocol in accordance with at least some embodiments of the present disclosure. The process in FIG. 9 could be implemented using, for example, system 100 discussed above. An example process may include one or more operations, actions, or functions as illustrated by one or more of operations 501, 502, 506, 507, 508, 510, 512, 514, 516, 518, 520, 522 and/or 524. Although illustrated as discrete operations, various operations may be divided into additional operations, combined into fewer operations, or eliminated, depending on the desired implementation. Processing may begin at operation 501.

At operation 501, a tile in a first requesting domain (e.g., Tile 1) can be adapted to generate and send a request to access data block X to another tile (e.g., Tile 2) in the first requesting domain. Operation 501 can be followed by operation 502, where one or more processor cores in the requesting domain can be arranged to determine whether data block X is stored in the requesting domain. When data block X is determined to be located in the requesting domain ("Yes"), processing may continue from operation 502 to operation 506, where data block X can be sent to the requesting processor core. Otherwise, when data block X is determined to be absent or not found in the requesting domain ("No"), processing may continue from operation 502 to operation 507.

At operation 507, the request can be sent (e.g., communicated or transmitted) to a tile (e.g., a directory tile) in the directory domain, where the tile includes a directory for data block X. Processing may continue from operation 507 to operation 508, where a processor core in the receiving tile of the directory domain is arranged to receive the request. Continuing from operation 508 to operation 510, the processor core in the receiving tile of the directory domain can be arranged to search (e.g., evaluate) the directory to determine a data domain where data block X is stored. Proceeding from operation 510 to operation 512, the processor core in the receiving tile of the directory domain can be arranged to further search the directory to determine (or identify) a representative tile in the data domain. Operation 512 can be followed by operation 514, where the request can be sent (e.g., transmitted or communicated) to the representative tile in the data domain. The data domain could be, for example, the same as the directory domain or a different domain. The request may also include an invalidation signal when the request is a request to write to the data.

Operation 514 can be followed by operation 516, where the request can be received by a processor core in a representative tile in the data domain. Continuing from operation 516 to operation 518, the representative tile can be arranged to send the request to the tile (e.g., data tile) storing data block X. Proceeding from operation 518 to operation 520, the processor core in the tile storing data block X can be arranged to send data block X to the requesting processor core in the requesting domain. Operation 520 may also include the processor storing the data block being adapted to invalidate its cache and send an acknowledgement of the invalidation to the requesting processor when the request is request to write to the data. Continuing from operation 520 to operation 522, the requesting processor core in the requesting domain is arranged to receive data block X. Operation 522 can be followed by operation 524, where the processor core in the directory domain is arranged to update the directory to indicate a state of data block X, such as to indicate that data block X is now also stored in the requesting domain. Operation 524 could also follow, for example, operation 510.

If data block X is only cached at the requesting processor in a state that permits a write (e.g., a "modified" state), data block X can be written directly by the requesting processor without involving operations 501 through 520. If data block X is not cached at the requesting processor, or cached in more than one location, operation 514 may involve sending an invalidation signal to all tiles that include a copy of X. Operation 520 may include a processor adapted to invalidate a local copy of block X, and sending an acknowledgement signal to the requesting processor.

Figure 10:
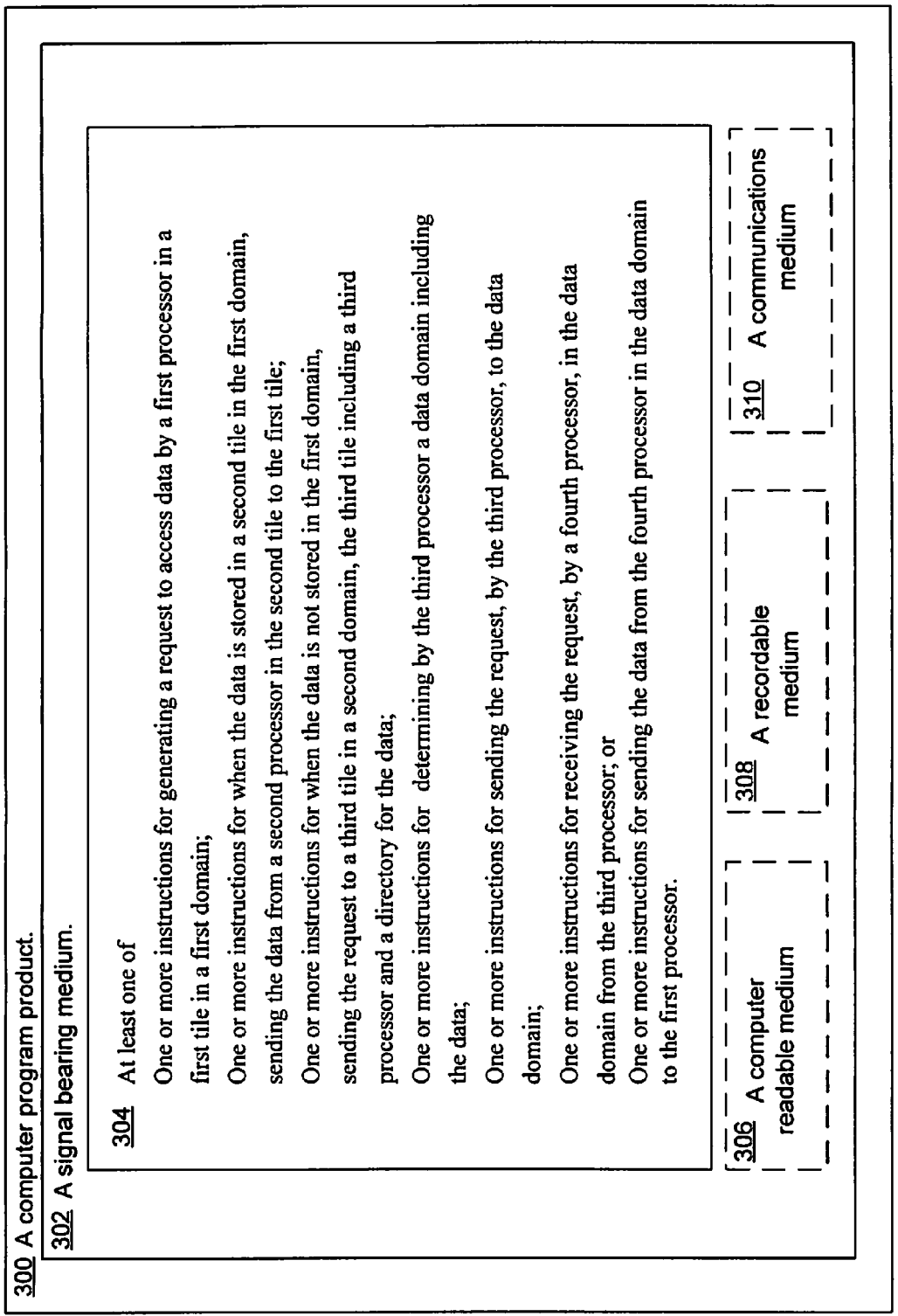
FIG. 10 illustrates a computer program product for a domain based cache coherence protocol.

FIG. 10 illustrates an example computer program product 300 arranged in accordance with at least some examples of the present disclosure. Program product 300 may include a signal bearing medium 302. Signal bearing medium 302 may include one or more instructions 304 that, when executed by, for example, a processor, may provide the functionality described above with respect to FIGS. 1-9. Thus, for example, referring to system 100, one or more of processors 112 in tiles 118, 130-144 may undertake one or more of the blocks shown in FIG. 10 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 11:
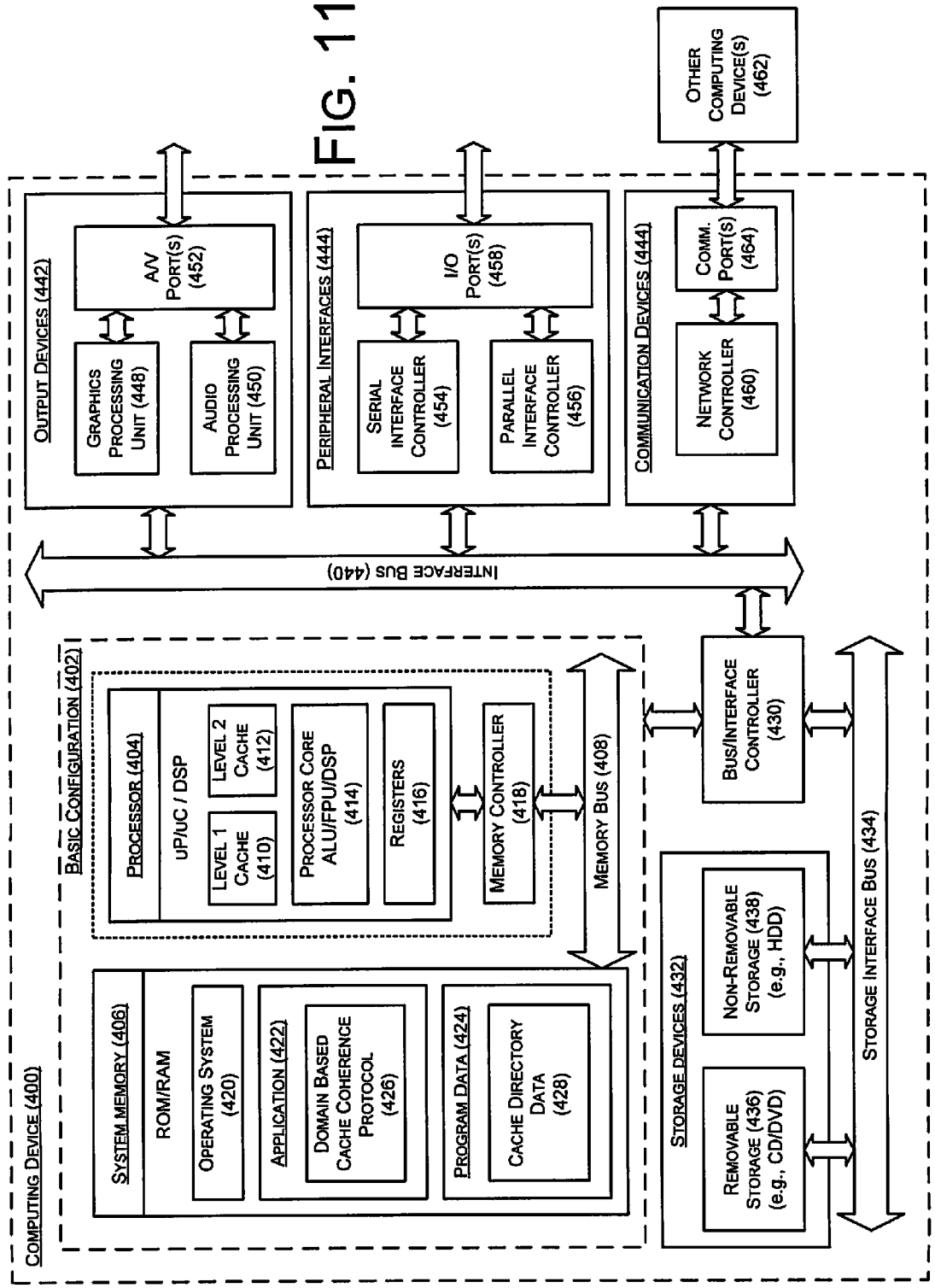
FIG. 11 shows a schematic diagram illustrating an example computer program product that includes a computer program for executing a computer process on a computing device for a domain based cache coherence protocol.

FIG. 11 is a block diagram illustrating an example computing device 400 that is arranged to perform a domain based cache coherence protocol in accordance with the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a domain based cache coherence protocol 426 that is arranged to perform the functions as described herein including those described with respect to system 100 of FIG. 2. Program data 424 may include cache directory data 428 that may be useful for a domain based cache coherence protocol as is described herein. In some embodiments, application 422 may be arranged to operate with program data 424 on operating system 420 such that a domain based cache coherence protocol may be provided. This described basic configuration 402 is illustrated in FIG. 11 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to access a data block in a cache with a domain based cache coherence protocol, the method comprising:
evaluating a request to access the data block by a first processor in a first tile in a first domain, the first tile includes the first processor effective to process instructions using data in a cache, the first domain includes the first tile and at least a second tile;
determining whether the data block is cached in the first domain;
when the data block is determined to be cached in the second tile in the first domain, sending the data block from a cache in the second tile to the first tile; and
when the data block is determined to be cached outside of the first domain:
sending the request to a third tile in a second domain, the third tile including a third processor and a directory, the directory including an indication of the data block and an indication of a data domain different from the first domain and different from the second domain, the data domain being where the data block is cached, the data domain includes at least two tiles, each tile in the data domain includes a respective processor and cache;
evaluating the directory with the third processor to determine the data domain associated with the cached location of the data block;
sending the request to the data domain by the third processor;
receiving the request from the third processor with a fourth processor in a fourth tile in the data domain; and
sending the data block from a cache in the fourth tile to a cache in the first tile in response to the request received by the fourth processor.

2. The method as recited in claim 1, wherein evaluating the directory with the third processor to determine a data domain comprises identifying a representative tile in the data domain, and wherein sending the request to the data domain by the third processor further comprises sending the request to the representative tile.

3. The method as recited in claim 2, wherein sending the request to the data domain further comprises receiving the request by the representative tile, and sending the received request to the fourth processor.

4. The method as recited in claim 3, wherein evaluating the directory with the third processor further comprises searching a table, the table indicating the data domain.

5. The method as recited in claim 4, wherein the table further identifies the representative tile in the data domain.

6. The method as recited in claim 5, wherein the table includes a bit-vector identifying the data domain.

7. The method as recited in claim 4, wherein a first binary value in the table indicates that the data block is stored in the cache, and a second binary value in the table, different from the first binary value, indicates that the data block is not stored in the cache.

8. The method as recited in claim 1, wherein the second domain and data domain are different from one another.

9. The method as recited in claim 1, wherein each of the first, second and third domains are associated with a respective virtual machine.

10. The method as recited in claim 1, further comprising sending the request to access the data block from the first processor to the second tile.

11. The method as recited in claim 1, further comprising sending the request to access the data block by the first processor to each tile in the first domain.

12. The method as recited in claim 1, further comprising:
writing to the data block with the first processor;
updating a status of each cache storing the data; and
updating the directory with the third processor in response to writing to the data block.

13. The method as recited in claim 1, wherein:
the first domain is associated with a first die;
the data domain is associated with a second die; and
the first and second dies are distinct from one another.

14. The method as recited in claim 1, wherein the data block corresponds to: a single data, a block of data, a single executable code, a block of executable code, or some combination thereof.

15. The method as recited in claim 1, wherein determining whether the data block is cached in the first domain further comprises using a static mapping of location/address to tile.

16. The method as recited in claim 1, wherein determining whether the data block is cached in the first domain further comprises evaluating a directory stored in the first domain.

17. The method as recited in claim 1, wherein determining whether the data block is cached in the first domain further comprises predicting whether the data block is cached in the first domain.

18. A device to access a data block in a cache with a domain based cache coherence protocol, the device comprising:
a first processor in a first tile in a first domain, wherein the first processor is configured to evaluate a request to access the data block, the first tile includes the first processor effective to process instructions using data in a cache, the first domain includes the first tile and at least a second tile;
a cache in a second tile in the first domain, wherein the cache in the second tile is configured to send the data block to the cache in the first tile in response to the request when the data block is determined to be cached in the second tile;
a third processor in a third tile in a second domain, wherein the third tile includes a directory, wherein the first processor is further configured to send the request to the third tile in the second domain when the data block is determined by the first processor to be cached outside of the first domain, and wherein the directory includes an indication of the data block and an indication of a data domain different from the first domain and different from the second domain, the data domain being where the data block is cached, the data domain includes at least two tiles, each tile in the data domain includes a respective processor and cache;
wherein the third processor is configured to determine a the data domain associated with the cached location of the data block, and also configured to send the request to the data domain;
a fourth processor in a fourth tile in the data domain that is configured to receive the request from the third processor; and
a cache in the fourth tile, wherein the cache in the fourth tile is configured to send the data block to the cache in the first tile in response to the request received by the fourth processor.

19. The device as recited in claim 18, wherein the third processor is further configured to identify a representative tile in the data domain and send the request to the representative tile.

20. The device as recited in claim 19, wherein the third processor is configured to search a table to determine the data domain, wherein the table identifies the data domain and the representative tile in the data domain.

21. The device as recited in claim 18, wherein:
the first processor is configured to write to the data block; and
the third processor is configured to update the directory in response to the first processor writing to the data block.

22. A non-transitory computer storage medium having computer-executable instructions stored thereon which, when executed by a computing device, adapt the computing device to perform a method for to access a data block in a cache with a domain based cache coherence protocol, the method comprising:
evaluating a request to access the data block by a first processor in a first tile in a first domain, the first tile includes the first processor effective to process instructions using data in a cache, the first domain includes the first tile and at least a second tile;
determining whether the data block is cached in the first domain;
when the data block is determined to be cached in a second tile in the first domain, sending the data block from a cache in the second tile to the first tile; and
when the data block is determined to be cached outside of the first domain:
sending the request to a third tile in a second domain, the third tile including a third processor and a directory, the directory including an indication of the data block and an indication of a data domain different from the first domain and different from the second domain,
the data domain being where the data block is cached, the data domain includes at least two tiles, each tile in the data domain includes a respective processor and cache;
evaluating the directory with the third processor to determine the data domain associated with the cached location of the data block;
sending the request to the data domain by the third processor;
receiving the request from the third processor with a fourth processor in a fourth tile in the data domain; and
sending the data block from a cache in the fourth tile to a cache in the first tile in response to the request received by the fourth processor.

23. The non-transitory computer readable storage medium as recited in claim 22, wherein evaluating the directory with the third processor to determine a data domain comprises identifying a representative tile in the data domain, and wherein sending the request to the data domain with the third processor further comprises sending the request to the representative tile.

24. A method for a tile to access a data block in a cache with a domain based cache coherence protocol, the method comprising:
evaluating a request to access the data block by a processor in the tile in a first domain, the tile includes a processor effective to process instructions using data in a cache, the first domain includes the first tile and at least a second tile;
determining whether the data block is cached in the first domain;
when the data block is determined to be cached in the second tile in the first domain, sending the request to the second tile in the first domain and receiving the data block from the second tile in response to the request sent to the second tile;
when the data block is determined to be cached outside of the first domain:
sending, by the processor, the request to a third tile in a second domain, the third tile including a directory that identifies the cached storage data domain of the data block, the data domain being different from the first domain and different from the second domain, the data domain includes at least two tiles, each tile in the data domain includes a respective processor and cache; and
receiving, by a cache in the tile, the data block from a data tile in a second domain that includes the cached storage location of the data block in response to the request send to the third tile.

25. The method as recited in claim 24, further comprising sending an update to the third tile from the processor to indicate that the data block is stored in the first domain.

26. The method as recited in claim 24, further comprising sending the request for the data block by the first processor to each tile in the first domain.

* * * * *

UNITED STATES PATENT AND TRADEMARK OFFICE
CERTIFICATE OF CORRECTION

PATENT NO. : 8,667,227 B2
APPLICATION NO. : 12/644658
DATED : March 4, 2014
INVENTOR(S) : Solihin It is certified that error appears in the above-identified patent and that said Letters Patent is hereby corrected as shown below:

On the Title Page, in Column 2, below "ABSTRACT" delete "26 Claims, 11 Drawing Sheets" and insert -- 25 Claims, 11 Drawing Sheets --, therefor.

In the Claims

In Column 13, Lines 60-61, delete "Claim 8. The method as recited in claim 1, wherein the second domain and data domain are different from one another.".

In Column 14, Lines 53-54, in Claim 18, delete "a the data" and insert -- the data --, therefor.

Signed and Sealed this
Twenty-second Day of July, 2014

Michelle K. Lee
*Deputy Director of the United States Patent and Trademark Office*